(12) United States Patent
Ichikawa et al.

(10) Patent No.: US 10,752,164 B2
(45) Date of Patent: Aug. 25, 2020

(54) VEHICULAR LAMP

(71) Applicant: Koito Manufacturing Co., Ltd., Tokyo (JP)

(72) Inventors: Tomoyuki Ichikawa, Shizuoka (JP); Satoshi Kikuchi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/970,984

(22) Filed: May 4, 2018

(65) Prior Publication Data
US 2018/0334085 A1 Nov. 22, 2018

(30) Foreign Application Priority Data

May 17, 2017 (JP) ................ 2017-098230

(51) Int. Cl.
*B60Q 1/14* (2006.01)
*G06K 9/00* (2006.01)
*G06K 9/20* (2006.01)
*H05B 45/50* (2020.01)
*H05B 47/10* (2020.01)
*B60Q 11/00* (2006.01)
*B60Q 1/115* (2006.01)

(52) U.S. Cl.
CPC ....... *B60Q 1/1415* (2013.01); *G06K 9/00791* (2013.01); *G06K 9/00805* (2013.01); *G06K 9/2027* (2013.01); *H05B 45/50* (2020.01); *H05B 47/10* (2020.01)

(58) Field of Classification Search
CPC ..... B60Q 11/00; B60Q 11/002; B60Q 11/005; B60Q 11/007; B60Q 1/0017; B60Q 1/115; B60Q 1/1423; B60Q 1/38; B60Q 1/44; B60Q 2300/054; B60Q 2300/112; B60Q 2300/132; B60Q 2300/146; B60Q 2300/324; B60Q 9/008; B60Q 1/1415
USPC ....................... 315/127, 129, 130
See application file for complete search history.

(56) References Cited

U.S. PATENT DOCUMENTS

2012/0098430 A1* 4/2012 Inoue ............... H05B 33/0893
  315/82
2013/0169191 A1* 7/2013 Ootsuka ........... H05B 33/0815
  315/308

(Continued)

FOREIGN PATENT DOCUMENTS

JP    2011-233305 A    11/2011
JP    2016-058370 A    4/2016

*Primary Examiner* — Wei (Victor) Y Chan
(74) *Attorney, Agent, or Firm* — Abelman, Frayne & Schwab

(57) ABSTRACT

A vehicular lamp of the present disclosure supports a light-on mode for flickering a light source. A driving unit flickers the light source. An abnormality circuit asserts an abnormality detection signal while a predetermined state indicative of an abnormality state is detected during the light-on of the light source. A timer circuit (i) advances clocking while the abnormality detection signal is asserted, during the light-on of the light source, and resets clocking when the abnormality detection signal is negated; (ii) maintains the clocked time during an immediately preceding light-on period while the light source is turned off; and (iii) asserts a fail signal when the clocked time reaches a predetermined determination time.

8 Claims, 10 Drawing Sheets

(56) References Cited

U.S. PATENT DOCUMENTS

2014/0241001 A1* 8/2014 Yoshikawa ............ B60Q 11/00
362/547
2016/0081171 A1* 3/2016 Ichikawa ............. B60Q 1/0088
315/77
2017/0182941 A1* 6/2017 Ohta ...................... H05B 45/46

* cited by examiner

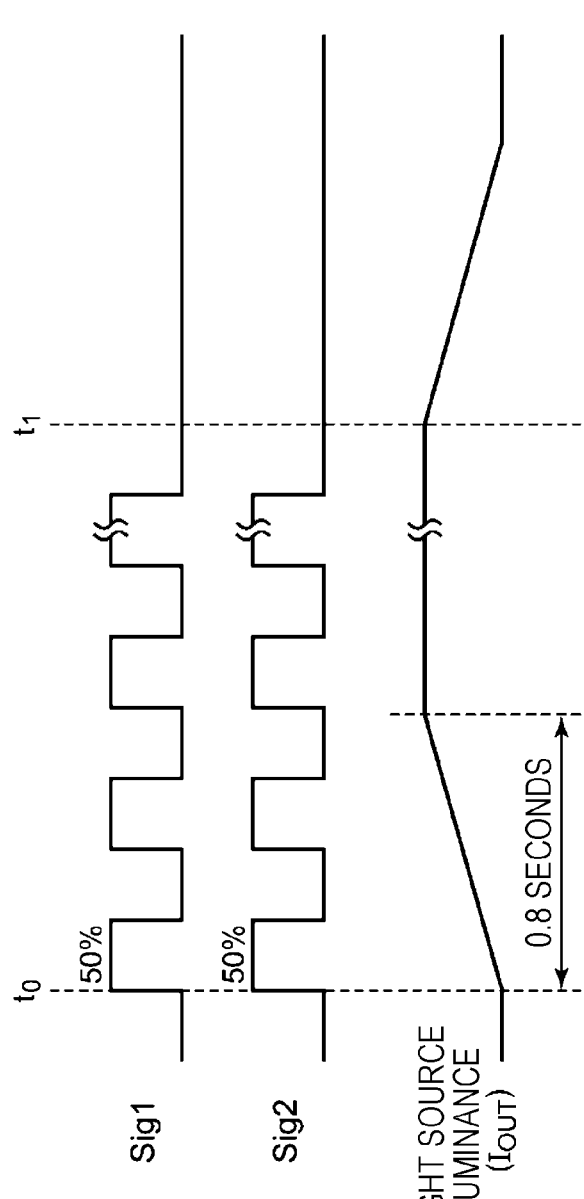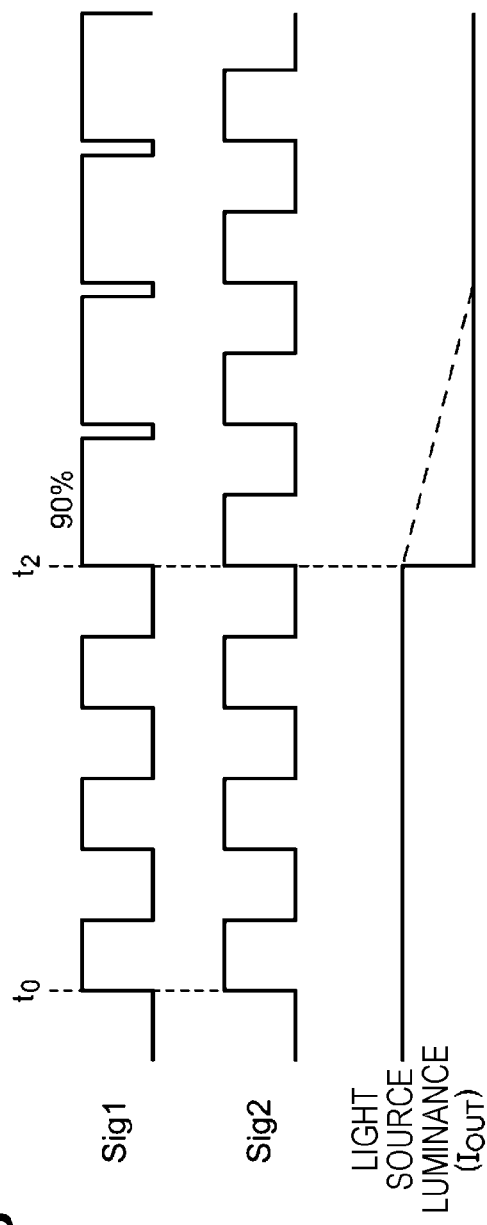

VEHICULAR LAMP

CROSS-REFERENCE TO RELATED APPLICATIONS

This application is based on and claims priority from Japanese Patent Application No. 2017-098230, filed on May 17, 2017, with the Japan Patent Office, the disclosure of which is incorporated herein in their entireties by reference.

TECHNICAL FIELD

The present disclosure relates to a vehicular lamp.

BACKGROUND

Recently, semiconductor light sources such as high-luminance laser diodes (LDs) and light-emitting didoes (LEDs) are used for a vehicular lamp. By using high-luminance light sources, it is possible to form a light distribution pattern that may enhance visibility and hence safety.

FIGS. 1A and 1B are views illustrating an example of a light distribution pattern using a high-luminance light source. It becomes possible to brighten a local area 700 at a distant location using a beam with a high directivity such as a laser. Visibility may be improved by irradiating a distance irradiation region 700 (referred to as a distance illumination high beam or an additional high beam) in addition to an illumination region 702 of the low beam and an illumination region 704 of the high beam during high speed traveling.

FIG. 1B is a view illustrating another example of a light distribution pattern using a high-luminance light source. By using a high-luminance light source, it becomes possible to draw figure information 712 such as a shape or a character on a road surface 710 at an illuminance higher than that of the illumination region 702 of the low beam (road surface marking). The figure information 712 may indicate the position of a walker 720 for the purpose of drawing attention to a driver, and may also inform the walker 720 of the approach of the vehicle. In addition, the figure information 712 may be used to trace a line that the vehicle has to travel, or to indicate the traveling direction at an intersection or a branch path based on navigation information. See, for example, Japanese Patent Laid-Open Publication No. 2011-233305 and Japanese Patent Laid-Open Publication No. 2016-058370.

SUMMARY

The inventors of the present disclosure have been aware of the following problems as a result of reviewing the above-described vehicular lamps.

When an abnormality occurs in a high-luminance light source used for a distance-illumination high beam or road surface marking, the surrounding is dazzled. Therefore, an abnormality detection circuit may be provided to monitor the presence or absence of an abnormality of the high-luminance light source, so that an appropriate protection processing may be performed when an abnormality state is detected.

In order to suppress erroneous detection of the abnormality state by noise, the abnormality detection circuit measures the duration time of a predetermined state indicative of the abnormality state by a timer circuit, and when the predetermined state lasts for a predetermined determination time, the abnormality detection circuit determines that an abnormality state occurs. From the viewpoint of suppressing dazzling by a high-luminance light source, the determination time may be set to be shorter than the reaction time (up to 250 ms) required for a person to feel glare and close the eyes. It is assumed that the determination time is set to, for example, 200 ms.

It is assumed that the abnormality detection circuit may detect the above-described predetermined state indicative of the abnormality state of the high-luminance light source with high accuracy only during the light-on of the high-luminance light source. When the detection accuracy deteriorates during the light-off period, it may be erroneously determined that a predetermined state has occurred even though the predetermined state has not occurred yet. This problem may be solved by forcibly determining that the predetermined state does not occur during the light-off period of the high-luminance light source, and resetting the timer circuit.

However, in road surface marking, it is effective to flicker figure information 712 drawn on a road surface in order to draw a stronger attention. For example, when the flickering is performed with several Hz, light-on time $T_{ON}$ becomes shorter than the determination time (200 ms). For example, when the flickering is performed with 4 Hz, the light-on time and the light-off time each become 125 ms. In this case, even when an abnormality occurs in the high-luminance light source, the reset of the timer circuit is repeated during the light-off period, so that the protection processing may not be performed.

The present disclosure has been made in view of the above-described problem. One of the exemplary objects of the present disclosure is to provide a light-on circuit capable of detecting an abnormality even when the light source is flickered.

An aspect of the present disclosure relates to a vehicular lamp. The vehicular lamp includes: a light source; a driving unit configured to flicker the light source; an abnormality detection unit configured to assert an abnormality detection signal while a predetermined state indicative of an abnormality state is detected during light-off of the light source; and a timer circuit configured to: (i) advance clocking while the abnormality detection circuit is asserted during light-on of the light source and reset clocking when the abnormality detection signal is negated; (ii) maintain clocked time in an immediately preceding light-on period, during the light-off of the light source; and (iii) assert a fail signal when the clocked time reaches a predetermined determination time.

According to the aspect, even when the light-on time is shorter than the determination time, the abnormality state may be reliably detected.

The light source may include a semiconductor light source configured to emit excitation light and a phosphor excited by the excitation light to emit fluorescence, and the light source may be configured to generate white output light including spectrums of the excitation light and the fluorescence, and the abnormality state may be leakage of the excitation light.

The abnormality state may be either a short and open of a light source, or a short and open of an output of a drive unit.

The drive unit may stop energizing the light source when the fail signal is asserted. This may quickly stop the emission of the light source.

The timer circuit may include: a capacitor; a charging/discharging circuit configured to charge the capacitor while the abnormality detection signal is asserted during the light-on of the light source, and discharge the capacitor when the abnormality detection signal is negated during the light-on of the light source; and a comparator configured to compare a voltage of the capacitor with a predetermined threshold value.

The abnormality detection circuit may include: a counter having a clock input terminal and a clear terminal; and a counter controller configured to supply a clock signal to the clock input terminal while the abnormality detection signal is asserted during the light-on of the light source, and supply a clear signal to the clear terminal when the predetermined state is not detected during the light-on of the light source.

The light source may be used for road surface marking.

The light source may be commonly used for road marking and for distance-illumination high beam. An abnormality state may also be detected when the light source is continuously turned on as a distance-illumination high beam.

In the meantime, any combination of the above-described components or replacement of the components or expressions of the present disclosure among, for example, a method, a device, and a system is also effective as an aspect of the present disclosure.

In addition, the description of this item (the means for solving the problem) does not explain all the features that are essential for the present disclosure. Therefore, the sub-combinations of the described features may be the present disclosure.

According to the present disclosure, an abnormality may be detected even when the light source is flickered.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 8A and 8B are operation waveform diagrams of a first light-on mode of the vehicular lamp of FIG. 2.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, embodiments of the present disclosure will be described with reference to the accompanying drawings. Equal or equivalent components, members, and processes illustrated in each of the drawings will be denoted by the same symbols, and overlapping descriptions thereof will be appropriately omitted. Further, the embodiment is not intended to limit the present disclosure thereto, but is illustrative of the present disclosure. All the features described in the embodiment or combinations thereof are not necessarily essential for the present disclosure.

In the present specification, "a state in which member A is connected with member B" includes a case where the members A and B are indirectly connected with each other without substantially affecting the electrical connecting state therebetween, a case where the members A and B are indirectly connected with each other without impairing a function or effect to be exhibited by a combination of these members, and a case where the members A and B are indirectly connected with each other via other members, in addition to a case where the members A and B are physically directly connected with each other.

Similarly, "a state in which member C is installed between member A and member B" includes a case where the members C and A or the members C and B are indirectly connected with each other without substantially affecting the electrical connecting state therebetween, a case where the members C and A or the members C and B are indirectly connected with each other without impairing a function or effect to be exhibited by a combination of these members, and a case where the members C and A or the members C and B are indirectly connected with each other via other members, in addition to a case where the members A and C or the members B and C are directly connected with each other.

Also, in the present specification, symbols denoted for electrical signals such as voltage signals and current signals, or circuit elements such as resistors and capacitors may indicate a voltage value, a current value, a resistor value, or a capacity value of each of them.

The vertical and horizontal axes of the waveform diagrams and time charts referred to in the present specification are appropriately enlarged and reduced for easy understanding, and the waveforms illustrated are also simplified, exaggerated, or emphasized for easy understanding.

Figure 1A:
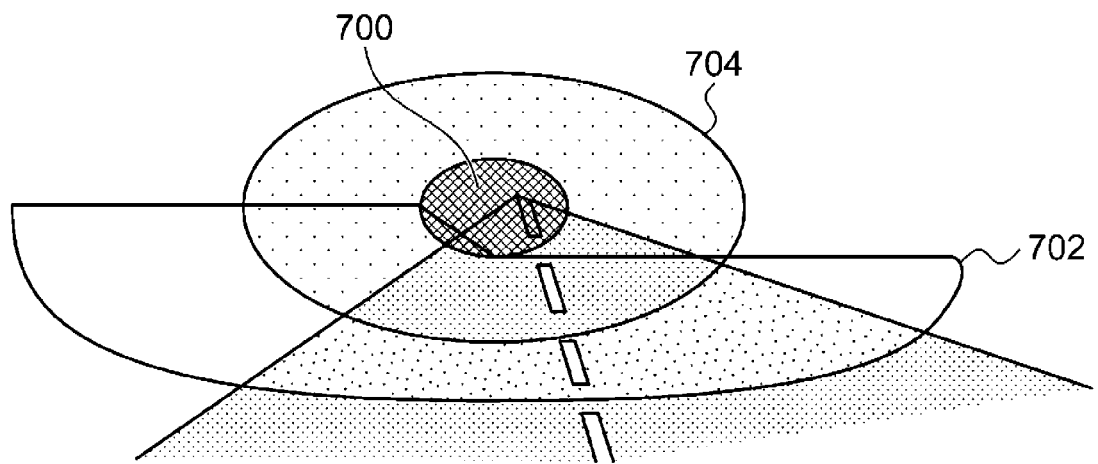
FIGS. 1A and 1B are views illustrating an example of a light distribution pattern using a high-luminance light source.
Figure 1B:
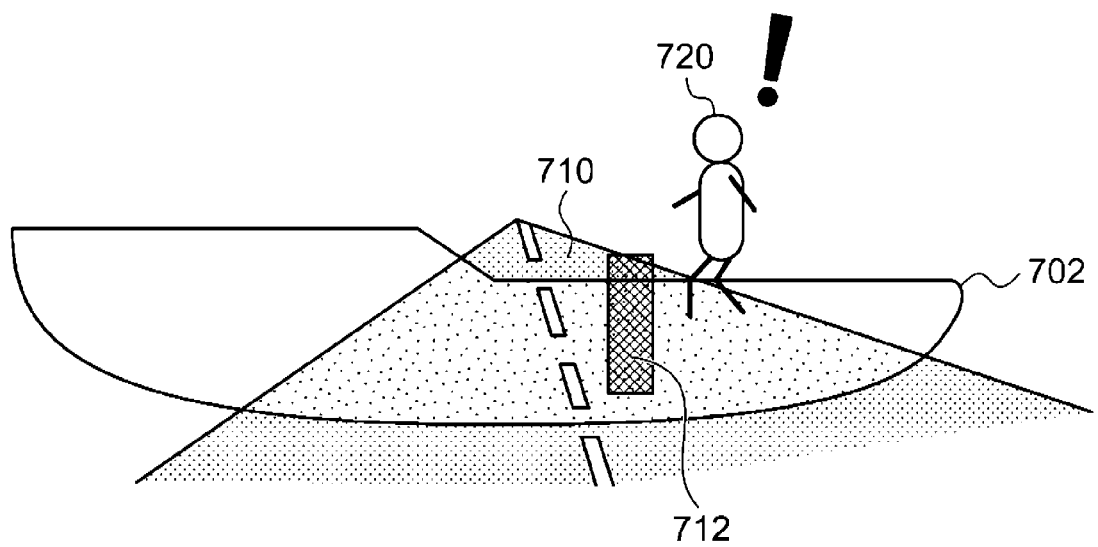
Figure 2:
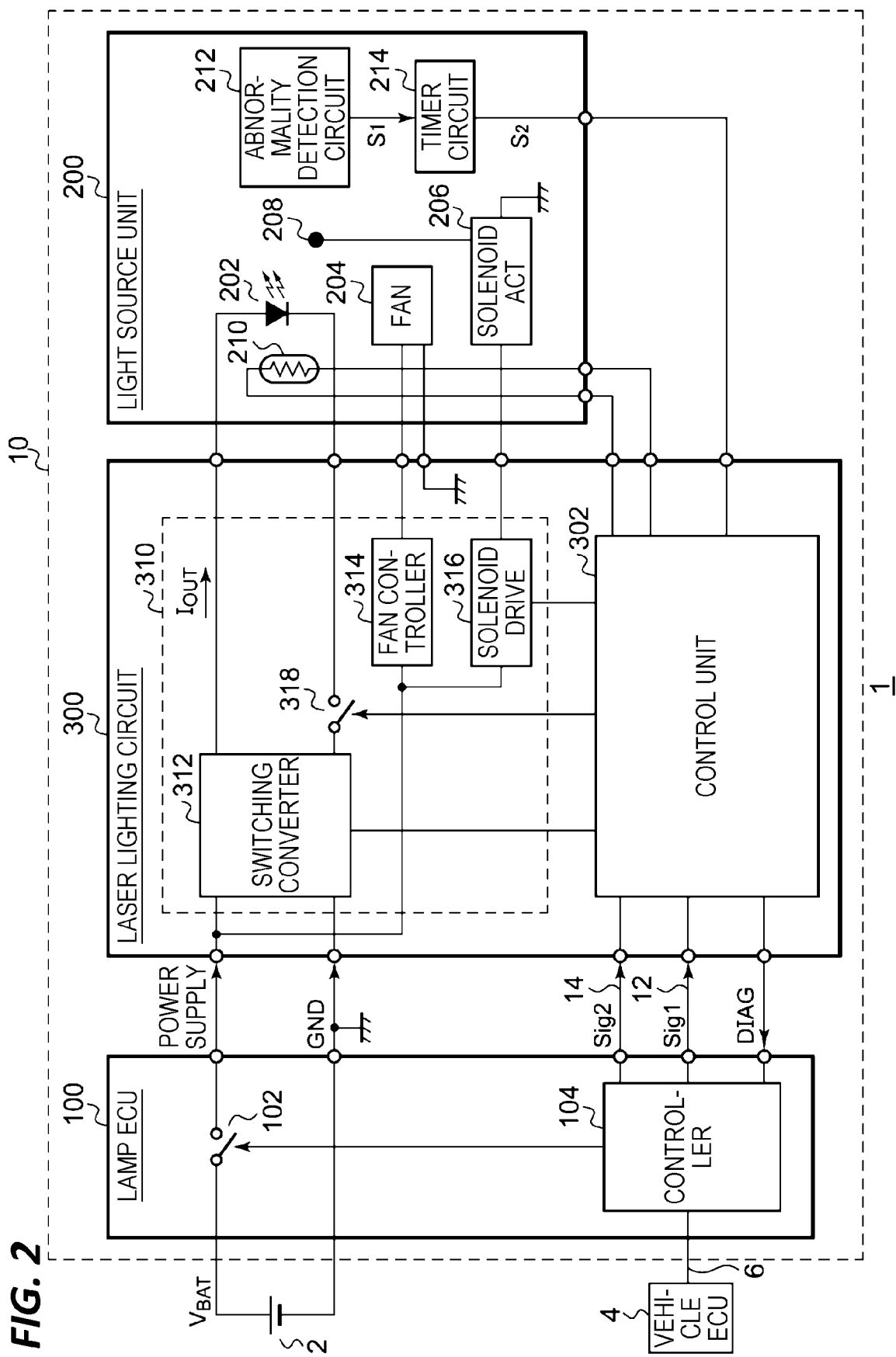
FIG. 2 is a block diagram of a lamp system according to an embodiment of the present disclosure.

FIG. 2 is a block diagram of a lamp system according to an embodiment of the present disclosure. The lamp system 1 includes a battery 2, a vehicle electronic control unit (ECU) 4, and a vehicular lamp 10. The vehicular lamp 10 provides an additional high beam and the road surface marking function illustrated in FIGS. 1A and 1B. FIG. 2 illustrates only functional blocks associated with this function, and the functional blocks relating to the low beam and the high beam are omitted.

The vehicular lamp 10 includes a lamp ECU 100, a light source unit 200, and a light-on circuit 300. The lamp ECU 100 mainly includes a switch 102 and a controller 104. The controller 104 is connected to the vehicle ECU 4 through a network 6 such as a controller area network (CAN) or a local interconnect network (LIN). The controller 104, which is a CPU, a microcontroller, or the like, receives a light-on/light-off instruction, vehicle speed information, camera information, and the like from the vehicle ECU 4, and controls the switch 102 and the light source unit 200 based on the received signal.

The switch 102 is provided on a supply path of the power supply voltage (the battery voltage $V_{BAT}$) from the battery 2 to the light-on circuit 300. When the controller 104 receives an on-command from the vehicle ECU 4, the switch 102 is turned on.

The source unit 200 includes a light source 202, a cooling fan 204, an actuator 206, a slit 208, a temperature detection element 210, an abnormality detection circuit 212, and a timer circuit 214. The light source 202 is a semiconductor light source such as a laser diode or an LED. The cooling fan 204 air-cools the light source 202. The temperature detecting element 210 is a thermistor, a thermocouple, or the like, and detects the temperature of the light source 202.

The lamp ECU 100 supports a plurality of light-on modes. In the present embodiment, the light-on modes may be switched depending on the state of the actuator 206. For example, a slit 208 is provided in the actuator 206, and the plurality of light-on modes may be switched depending on the position of the slit 208. Alternatively, the actuator 206 may control the position of the light source 202 and the lens or mirror of an optical system (not illustrated), or the inclination thereof so as to switch the plurality of light-on modes.

One of the light-on modes is accompanied by flickering of the light source 202, for example, road surface marking. Another one of the light-on modes is, for example, a distance-illumination high beam.

The light-on circuit 300 includes a control unit 302 and a drive unit 310. The control unit 302 controls the drive unit 310 based on control signals Sig1 and Sig2 from the controller 104. Also, the control unit 302 outputs a diagnostic signal DIAG indicating the diagnosis result of the light source unit 200 and the light-on circuit 300 (presence or absence of abnormality) to the controller 104.

The drive unit 310 includes a switching converter 312, a fan controller 314, a solenoid drive circuit 316, and a protection switch 318. The switching converter 312 has a constant current output and generates a drive current $I_{OUT}$ stabilized at a target current $I_{REF}$ so as to supply the drive current $I_{OUT}$ to the light source 202. The fan controller 314 drives the cooling fan 204. For example, the actuator 206 is a solenoid actuator, and a solenoid drive circuit (actuator drive circuit) 316 drives the actuator 206. The protection switch 318 is provided on the path of the drive current $I_{OUT}$ and is off when an abnormality is detected.

The vehicular lamp 10 has a fail-safe function. The abnormality detection circuit 212 and the timer circuit 214 are provided in association with the fail-safe function. The abnormality detection circuit 212 monitors an abnormality state occurring in the vehicular lamp 10. The abnormality detection circuit 212 asserts the abnormality detection signal $S_1$ while a predetermined state indicative of the abnormality state is detected during the light-on of the light source 202.

For example, the light source 202 may be a white light source including a blue laser and a phosphor. The emitted light (excitation light) of the blue laser is incident on the phosphor and synthesized with the yellow light generated by the phosphor to generate white light.

Normally, the blue laser is scattered by the phosphor. In the meantime, when the phosphor disappears from the optical axis of the blue laser, or when the influence of the aging changes becomes noticeable, the raw blue laser light will be emitted without scattering (i.e., a light leakage abnormality) and the surrounding may be dazzled. The abnormality detection circuit 212 may monitor the light leakage abnormality. In addition, the abnormality detection circuit 212 may detect abnormality or the like of the optical axis of the light source 202.

The abnormality detection circuit 212 may be provided at a place where an abnormality of the object to be detected can be easily detected and the abnormality detection circuit 212 may be provided in the light source unit 200 when an object to be detected is a light leakage abnormality. The configuration of the abnormality detection circuit 212 is not particularly limited. However, for example, the circuit described in Japanese Patent Laid-Open Publication No. 2016-058370 may be used.

The timer circuit 214 generates a fail signal $S_2$ based on the abnormality detection signal $S_1$ generated by the abnormality detection circuit 212. The timer circuit 214 (i) advances clocking while the abnormality detection signal $S_1$ is asserted during the light-on of the light source 202, and resets clocking when the abnormality detection signal $S_1$ is negated. In addition, the timer circuit 214 maintains (ii) the time clocked in the immediately preceding light-on period, during the light-off of the light source 202. The timer circuit 214 (iii) also asserts the fail signal $S_2$ when the clocked time reaches a predetermined determination time $T_0$. The timer circuit 214 may be provided in the light source unit 200 or may be configured as a portion of the control unit 302 on the light-on circuit 300 side.

Figure 3:
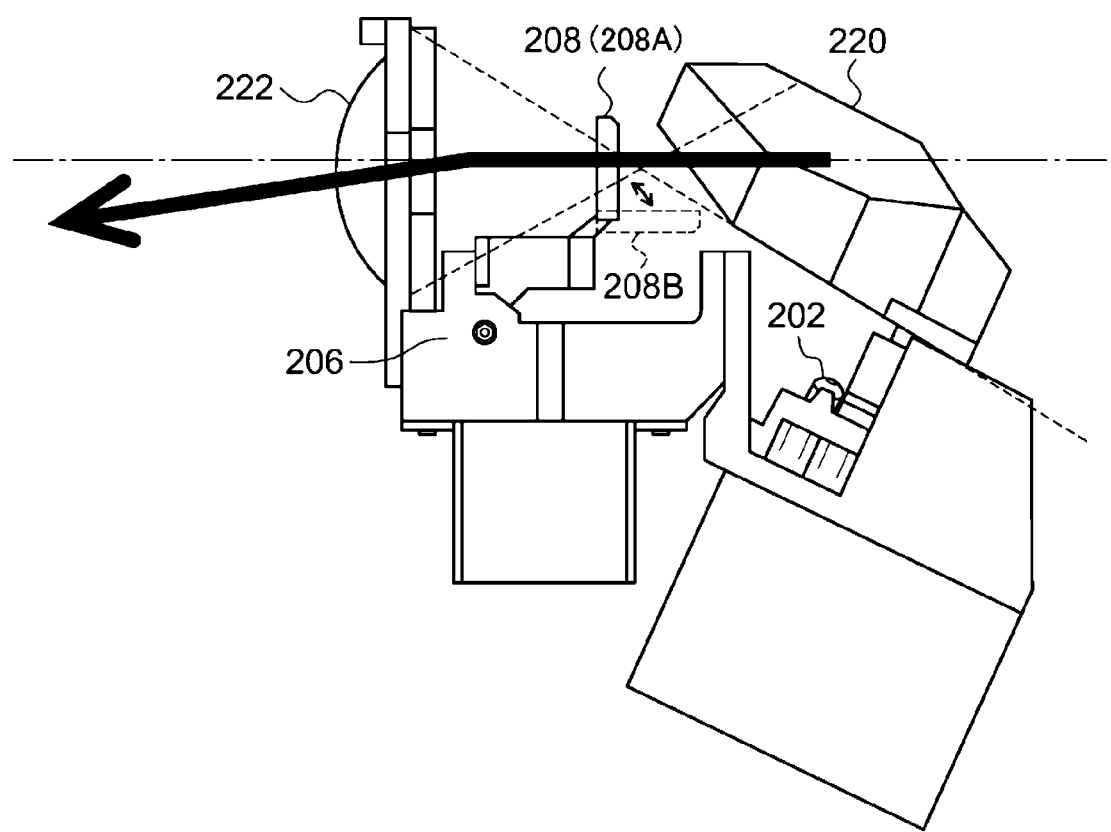
FIG. 3 is a cross-sectional view illustrating a configuration example of a light source unit.

FIG. 3 is a cross-sectional view illustrating a configuration example of a light source unit 200. The mirror 220 and the lens 222 reflect and collect the light emitted from the light source 202 so as to adjust the diffusion angle and the optical axis of the emitted light. The slit 208 is provided between the mirror 220 and the lens 222. The actuator 206 changes the position of the slit 208 to positions 208A and 208B in FIG. 3. For example, in the non-energized state of the actuator 206, the position of the slit 208 is 208 A. At this time, the reflected light of the mirror 220 passes through the slit 208 to form a light distribution pattern suitable for road surface marking. When current is supplied to the solenoid of the actuator 206 (energized state), the position of the slit 208 changes to 208B, and the slit 208 does not act on the light. The light distribution of the distance-illumination high beam is also formed.

Figure 4:
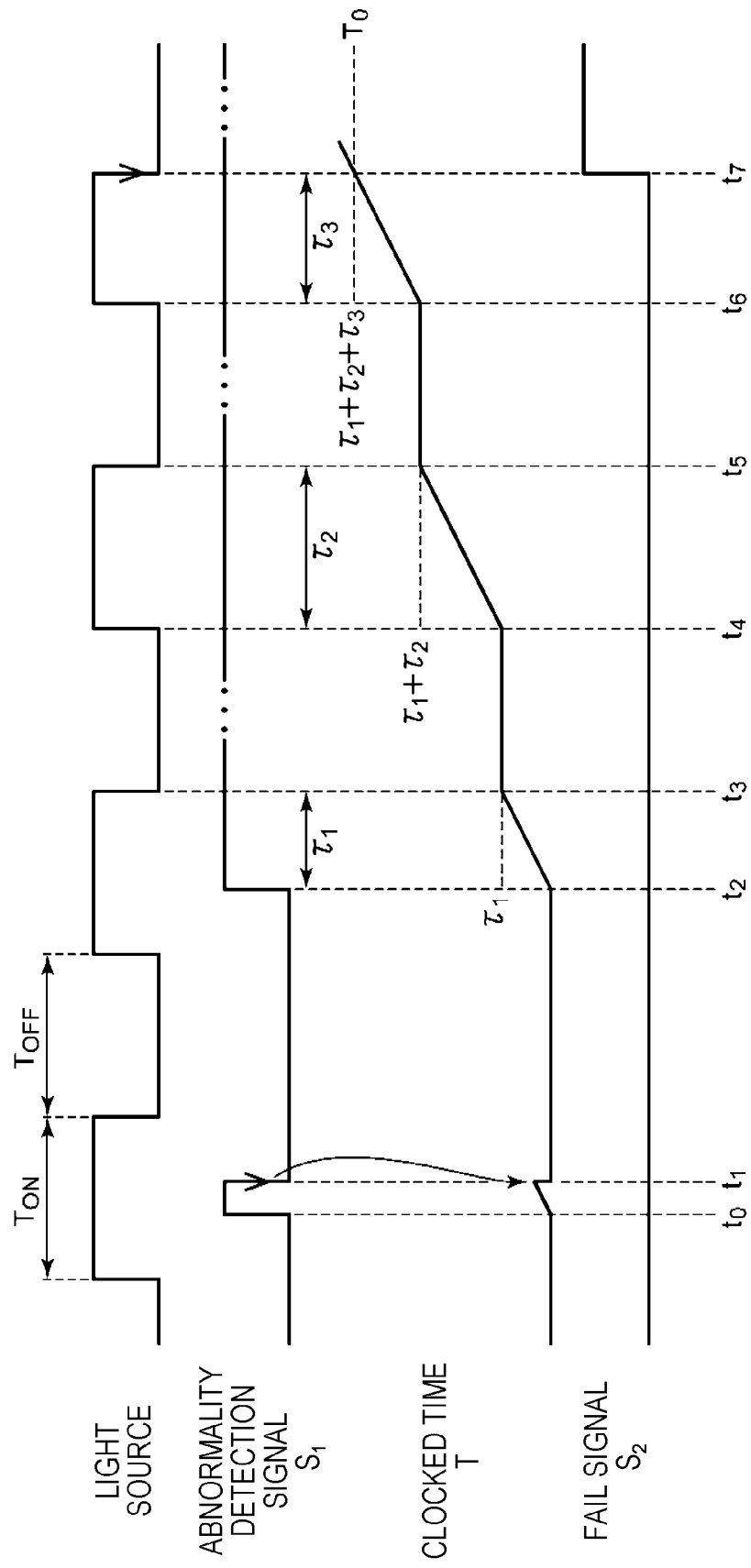
FIG. 4 is a view for explaining an abnormality detection operation by a vehicular lamp.

FIG. 4 is a view for explaining an abnormality detection operation by a vehicular lamp 10. The vehicular lamp 10 operates in a light-on mode in which the light source 202 is flickered (e.g., road surface marking), and the light source 202 repeats the light-on period $T_{ON}$ and the light-off period $T_{OFF}$ at a predetermined cycle.

During the period from time $t_0$ to time $t_1$, the abnormality detection signal $S_1$ is asserted (indicated as a high level in this case) even when light leakage abnormality does not occur due to the influence of noise. The timer circuit 214 clocks a period during which the abnormality detection signal $S_1$ is asserted. When the abnormality detection signal $S_1$ is negated (becomes a low level) at time $t_1$, the clocked time T is reset to zero.

When a light leakage abnormality occurs in the light source 202 at time $t_2$, the abnormality detection circuit 212 asserts the abnormality detection signal $S_1$. The timer circuit 214 advances clocking while the abnormality detection signal $S_1$ is asserted during the light-on period $T_{ON}$, and the clocked time T increases.

During the light-off period from time $t_3$ to time $t_4$, the clocked time T is maintained at the final value $\tau_1$ of the immediately preceding light-on period. The state of the abnormality detection signal $S_1$ during the light-off period does not ask whether it is asserted or negated.

When the next light-on period is initiated at time $t_4$, the timer circuit 214 resumes clocking from the clocked time $\tau_1$ that has been held. During the light-off period from time $t_5$ to $t_6$, the clocked time $T=\tau_1+\tau_2$ is held. When the next light-on period is initiated at time $t_6$, the timer circuit 214 resumes clocking from the clocked time $\tau_1+\tau_2$ that has been held. Further, at time $t_7$, when the clocked time T reaches a determination threshold value $T_0$, the fail signal $S_2$ is asserted, the driving of the light source 202 is stopped, and the light emission is stopped.

The operation of the vehicular lamp 10 has been described above. With the vehicular lamp 10, even when an abnormality occurs while the light source 202 is flickered, the abnormality may be reliably detected and the light emission of the light source 202 may be stopped. Further, when the abnormality detection signal $S_1$ is erroneously asserted due to noise during normal operation, the fail signal $S_2$ is not asserted erroneously, and the light emission of the light source 202 may be kept.

Figure 5:
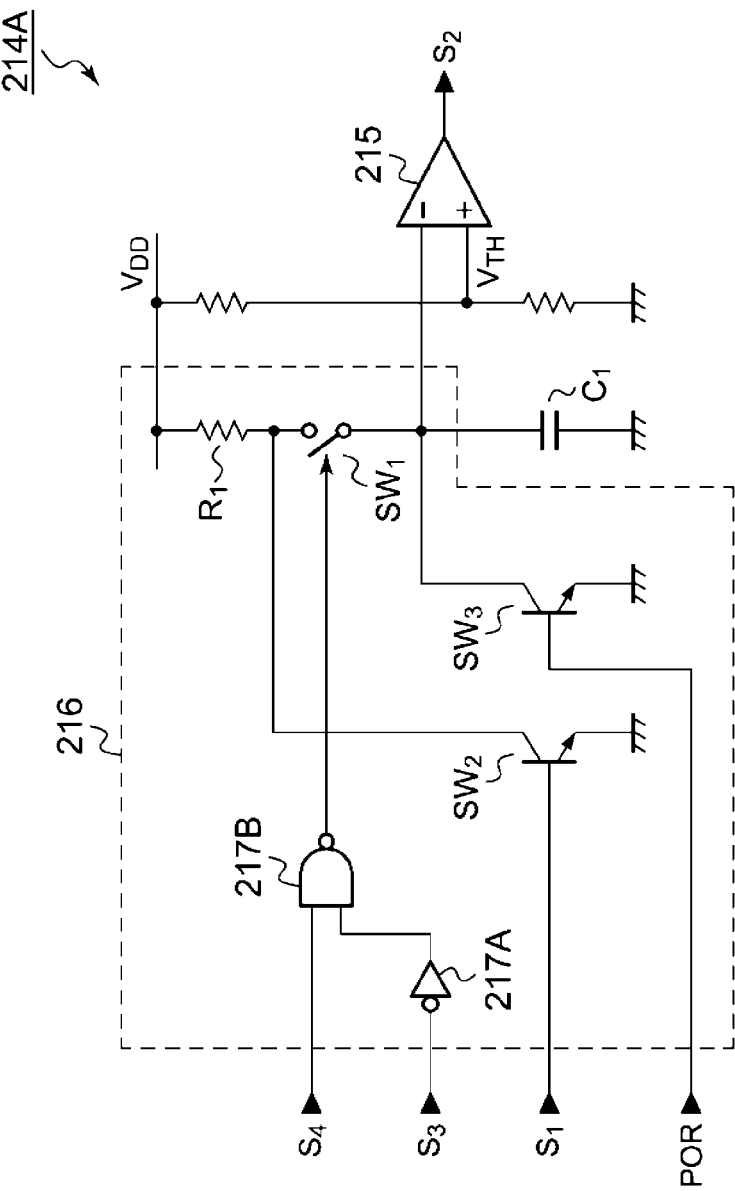
FIG. 5 is a circuit diagram illustrating a configuration example of a timer circuit.

FIG. 5 is a circuit diagram illustrating a configuration example 214A of a timer circuit 214. The timer circuit 214A includes a capacitor $C_1$, a charging/discharging circuit 216, and a comparator 215.

One end of the capacitor $C_1$ is grounded. The charging and discharging circuit 216 charges the capacitor $C_1$ while the abnormality detection signal $S_1$ is asserted (at a low level in this example) during the light-on of the light source 202, and discharges the capacitor $C_1$ when the abnormality detection signal $S_1$ is negated (at a high level in this example) during the light-on of the light source 202.

The charging/discharging circuit 216 includes a charge resistor $R_1$, a charging switch $SW_1$, a discharging switch $SW_2$, a reset switch $SW_3$, an inverter 217A, and a NAND gate 217B. A light-on/light-off instructing signal $S_3$ is at a high level (H) during the light-on period and at a low level (L) during the light-off period. A mode control signal S4 is at a high level when the road surface marking mode is valid, and at a low level when it is invalid. The inverter 217A inverts the light-on/light-off instructing signal $S_3$. The NAND gate 217B generates a negative logical product of the mode control signal $S_4$ and the output of the inverter 217A. The charging switch $SW_1$ is provided in series with the charge resistor $R_1$ between a power supply line $V_{DD}$ and the capacitor $C_1$. The charging switch $SW_1$ is on when the output of the NAND gate 217B is at a high level, and off when the output is at a low level. Thus, when the road surface marking mode is valid, and the light-on period occurs, the capacitor $C_1$ becomes chargeable.

One end of the discharging switch $SW_2$ is grounded, and the other end thereof is connected to a connection node between the charging resistor $R_1$ and the charging switch $SW_1$. The discharging switch $SW_2$ is on when the abnormality detection signal $S_1$ is at a high level (i.e., the abnormality detection signal $S_1$ is normal), and the capacitor $C_1$ is not charged. When the abnormality detection signal $S_1$ is at a low level (i.e., in a predetermined state indicative of the abnormality), the discharging switch $SW_2$ is off and the capacitor $C_1$ is charged through the charging switch $SW_1$ and the resistor $R_1$. The reset switch $SW_3$ is on in response to a power-on reset signal and discharges the charge on the capacitor $C_1$. The configuration of the charging/discharging circuit 216 is not limited to that illustrated in FIG. 4.

The comparator 215 compares voltage $V_{C1}$ of the capacitor $C_1$ with a predetermined threshold value $V_{TH}$. The output of the comparator 215 corresponds to the fail signal $S_2$. When $V_{C1}>V_{TH}$, the output of the comparator 215 becomes a low level. The threshold voltage $V_{TH}$ may be generated by dividing the power supply voltage by resistance.

In the timer circuit 214, the voltage $V_{C1}$ of the capacitor $C_1$ corresponds to the clocked time T, and the threshold voltage $V_{TH}$ corresponds to the determination threshold value $T_0$.

Figure 6:
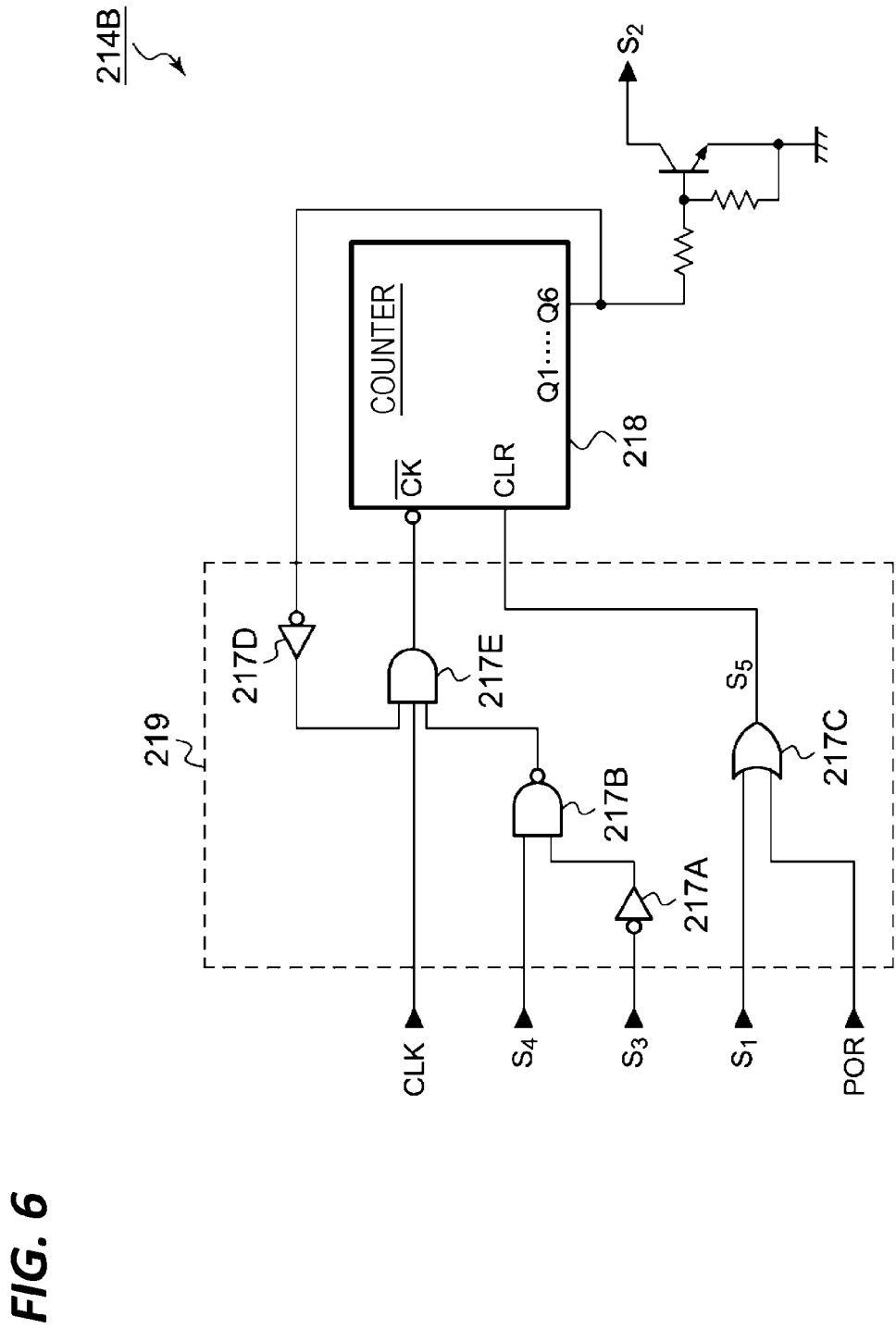
FIG. 6 is a circuit diagram illustrating another configuration example of the timer circuit.

FIG. 6 is a circuit diagram illustrating another configuration example 214B of the timer circuit 214. The timer circuit 214B includes a counter 218 and a counter controller 219. The counter 218 has a clock input terminal CK and a clear terminal CLR. In this example, the counter 218 has 6 bits.

The counter controller 219 supplies the clock signal CLK to the clock input terminal CK of the counter 218 while the abnormality detection signal $S_1$ is asserted during the light-on of the light source 202. Also, when the abnormality detection signal $S_1$ is negated during the light-on of the light source 202, a high level clear signal $S_5$ is supplied to the clear terminal CLR of the counter 218.

The timer circuit 214B asserts the fail signal $S_2$ (in this example, at a low level) when the highest bit Q6 of the counter 218 is set to 1.

The configuration of the counter controller 219 is not particularly limited and may be configured by a combination circuit so that the above-described functions may be implemented. The inverter 217A and the NAND gate 217B correspond to those in FIG. 5. An inverter 217D inverts the highest bit Q6 of the count value of the counter 218. An AND gate 217E is a mask circuit that passes the clock signal CLK when Q6 is at a low level and the output of NAND gate 217B is at a high level. Otherwise, the AND gate 217E masks the clock signal CLK. The OR gate 217C generates a logical sum of the abnormality detection signal $S_1$ and the power reset signal POR so as to supply the generated logical sum to the clear terminal of the counter 218.

With the timer circuit 214B, the fail signal $S_2$ may be generated in accordance with the state of the counter 218 (the highest bit).

The abnormality to be monitored by the abnormality detection circuit 212 is not limited to the light leakage abnormality. For example, the abnormality detection circuit 212 may detect a short-circuit abnormality of the light source 202, an open abnormality thereof, an over-voltage abnormality of the drive unit 310, an over-current abnormality thereof, and the like.

FIG. 2 is referred to again. Next, an interface between the control unit 302 and the controller 104 will be described. The control unit 302 receives the first control signal Sig1 and the second control signal Sig2 via two control lines 12 and 14, and selects one of the light-off mode and the plurality of light-on modes based on the first control signal Sig1 and the second control signal Sig2. The drive unit 310 drives the light source unit 200 according to the mode selected by the control unit 302.

Thus, a plurality of modes may be selected with the two control lines 12 and 14, regardless of the number of the light-on modes.

The control unit 302 selects the light-off mode when at least one of the first control signal Sig1 and the second control signal Sig2 is a non-pulse signal. In the light-off mode, the target current $I_{REF}$ of the switching converter 312 is set to zero, and the drive current $I_{OUT}$ becomes zero. The protection switch 318 may be off in the light-off mode.

When a ground fault or a fault in the control lines 12 and 14 or an abnormality in the output interface of the controller 104 occurs, at least one of the potentials of the control lines 12 and 14 is fixed and the pulse signal cannot be propagated, it is ensured that the light-off mode is necessarily selected, so that the light source 202 may be off and the fail-safe function may be enhanced.

The control unit 302 selects one of a plurality of light-on modes based on the combination of the duty ratio of the first control signal Sig1 and the second control signal Sig2 when both the first control signal Sig1 and the second control signal Sig2 are pulse signals. The frequencies of the first control signal Sig1 and the second control signal Sig2 may be constant, for example, about 200 Hz.

The control unit 302 selects a first light-on mode MODE1 when the duty ratio of the first control signal Sig1 is included in a first range (e.g., 40% to 80%), and selects a second light-on mode MODE2 when the duty ratio of the first control signal Sig1 is in a second range (20% to 40%).

When the state of the actuator 206 changes in accordance with the light-on mode, the control unit 302 gives a different control command to the solenoid drive circuit 316 for each mode.

As an example, the first light-on mode is the distance-illumination mode described with reference to FIG. 1A, and the second light-on mode is the road surface marking mode described with reference to FIG. 1B. Hereinafter, such a case will be described.

The duty ratio of the second control signal Sig2 may be used to control parameters other than the light-on mode. For example, in the second light-on mode, when the duty ratio of the second control signal Sig2 is included in the first range (e.g., 0% to 20%), the control unit 302 supplies the drive current $I_{OUT}$ to the light source 202 so as to light the light source 202. When the duty ratio of the control signal Sig2 is included in the second range (e.g., 80% to 100%), the drive current $I_{OUT}$ may be set to zero so as to turn off the light source 202. In the first light-on mode, the duty ratio of the second control signal Sig2 may be masked.

That is, the light source 202 may be flickered by alternating the duty ratio of the second control signal Sig2 between the first range and the second range in the second light-on mode (road surface marking mode).

In the first light-on mode, the drive unit 310 may gradually turn on/turn off the light source 202. Specifically, upon receiving a lighting-on command, the drive unit 310 gradually increases the drive current $I_{OUT}$ with time so as to gradually increase luminance. However, when the drive unit 310 receives the light-off instruction, the drive unit 310 may gradually decrease the drive current $I_{OUT}$ with time so as to gradually decrease luminance. A sense of quality may be created by using the change in luminance of the light source 202.

Further, the drive unit 310 may instantaneously turn off the light source 202 when the duty ratio of the first control signal Sig1 is included in a third range adjacent to the first range (e.g., 80% to 100%). In the first light-on mode (distance-illumination mode), in order to suppress dazzling of the preceding vehicle or the opposite vehicle by the beam, when the preceding vehicle is detected, it is requested that the light source 202 be turned off instantaneously, rather than gradually. Therefore, the safety may be further improved by assigning a portion of the duty ratio of the first control signal Sig1 to the instantaneous light-off.

A third light-on mode MODE3 may also be added. When the duty ratio of the first control signal Sig1 is in a fourth range (e.g., 0% to 20%), the third light-on mode MODE3 may be selected.

Since the light source 202 has a high luminance, when the vehicle is stopped (or running at low rate), the surroundings are strongly dazzled. Therefore, the controller 104 is designed to monitor the vehicle speed and select the first light-on mode (the distance-illumination mode) and the second light-on mode (the road surface marking mode) only when the vehicle speed is equal to or greater than a predetermined value. In this case, there is a problem that when the vehicle is stopped, the light source 202 cannot be turned on for the purpose of maintenance or the like. Therefore, the third light-on mode MODE3 capable of turning on the light source 202 (referred to as a "maintenance mode") may be provided even when the vehicle is stopped. This makes it possible to perform maintenance.

As described above, the drive unit 310 gradually turns on the light source 202 in the first light-on mode MODE1. However, in the third light-on mode MODE3, the light source 202 may be turned on at a speed slower than the first light-on mode MODE1.

There is a delayed response to the abnormality detection of the light source 202 in the abnormality detection circuit 212. By slowing the rate of increase in luminance, the increase extent in the luminance of the light source during the delayed response may be made small, so that the light source may be turned off at a smaller luminance when an abnormality has occurred.

Figure 7:
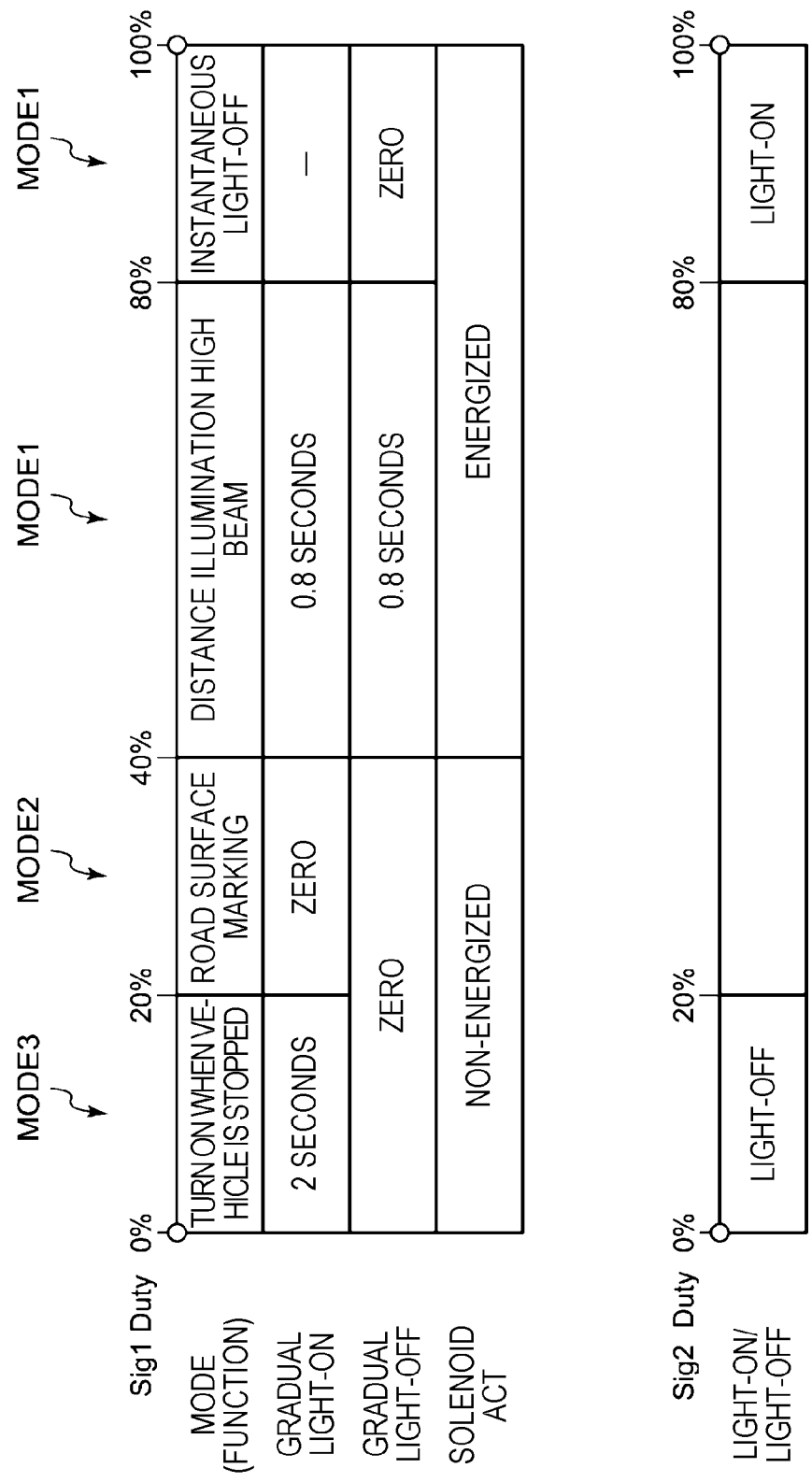
FIG. 7 is a view illustrating the corresponding relationship among a first control signal, a second control signal, and a plurality of modes or functions.

FIG. 7 is a view illustrating the corresponding relationship among a first control signal Sig1, a second control signal Sig2, and a plurality of modes or functions.

FIGS. 8A and 8B are operation waveform diagrams of a first light-on mode of the vehicular lamp of FIG. 2. FIG. 8A is referred to. Before time $t_0$, the light source 202 is turned off. When the first control signal Sig1 and the second control signal Sig2 having a duty ratio of 50% are given at time $t_0$, the control unit 302 determines that the control signals are in the first light-on mode MODE1. During this time, the second control signal Sig2 may be non-pulsing and does not need to be 80% to 100%. The switching converter 312 sets the drive current $I_{OUT}$ at a first rate (e.g., a time constant of 0.8 seconds). As a result, the light source 202 is turned on slowly (gradual light-on), thereby suppressing rapid changes in luminance, suppressing dazzling of an operator and the surroundings, and creating a sense of quality.

When at least one of the first control signal Sig1 and the second control signal Sig2 is changed to non-pulse at time $t_1$, the control unit 302 determines that it is in the light-off mode, decreases the output current $I_{OUT}$ at the first rate, and gradually turned off the light source 202.

FIG. 8B is referred to. Before time $t_2$, the light source unit 200 is turned on in the first light-on mode. At time $t_2$, when a preceding vehicle is detected, the duty ratio of the first control signal Sig1 is changed to 90%. Then, the control unit 302 sets the output current $I_{OUT}$ of the switching converter 312 to zero in a time shorter than the time of the gradual light-off. Thus, the light source 202 may be instantaneously turned off, thereby suppressing dazzling of the preceding vehicle.

Figure 9A:
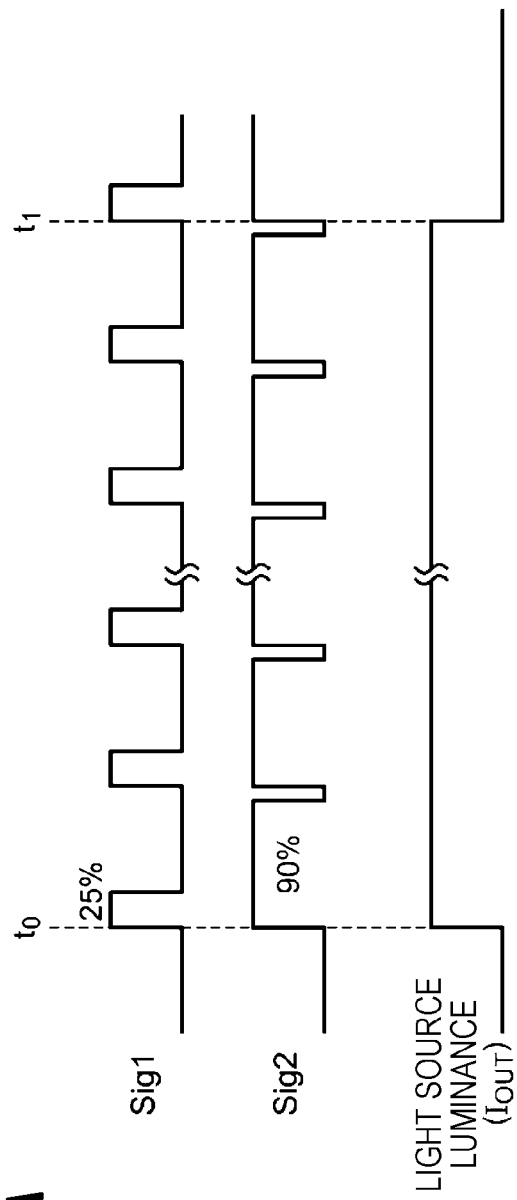
FIGS. 9A and 9B are operation waveform diagrams of a second light-on mode of the vehicular lamp of FIG. 2.
Figure 9B:
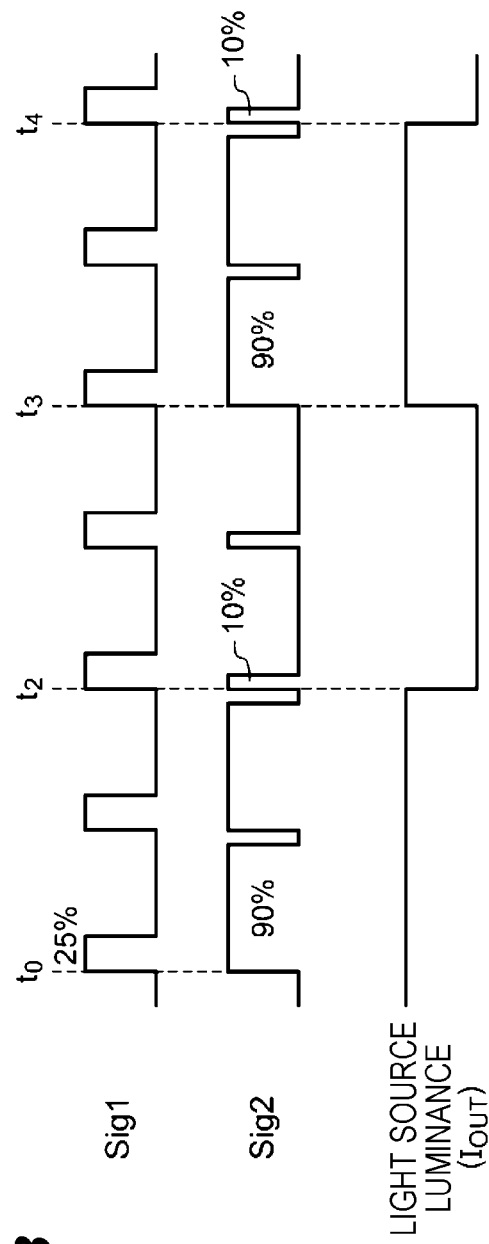

FIGS. 9A and 9B are operation waveform diagrams of a second light-on mode of the vehicular lamp of FIG. 2. FIG. 9A is referred to. Before time $t_0$, the light source 202 is turned off. When the first control signal Sig1 having a duty ratio of 25% and the second control signal Sig2 having a duty ratio of 90% are given at time $t_0$, the control unit 302 determines that the control signals are in the second light-on mode MODE2. The switching converter 312 increases the drive current $I_{OUT}$ at a rate faster than the first rate (e.g., a time constant of 0.8 seconds). Thus, the light source 202 is instantaneously lit, and appropriate figure information is drawn on the road surface.

When at least one of the first control signal Sig1 and the second control signal Sig2 is changed to a non-pulse at time $t_1$, the control unit 302 determines that the control signals are in the light-off mode. Also, the output current $I_{OUT}$ is decreased at a rate higher than the first rate, and the light source 202 is instantaneously turned off.

FIG. 9B is referred to. Before time $t_2$, the light source unit 200 is turned on in the second light-on mode. After time $t_2$, the duty ratio of the second control signal Sig2 is changed to two values of 90% and 10% at a predetermined flickering cycle (e.g., 0.3 seconds). Thus, the light source 202 may be flickered.

A pulse for flickering control may be generated using the oscillator of the vehicular lamp so as to flicker the light source. However, in this method, the light sources in the right lamp and the left lamp are flickered asynchronously. As described here, it becomes possible to synchronize the flickering operations of the left and right lamps by superimposing control information for flickering on the second control signal Sig2.

Figure 10:
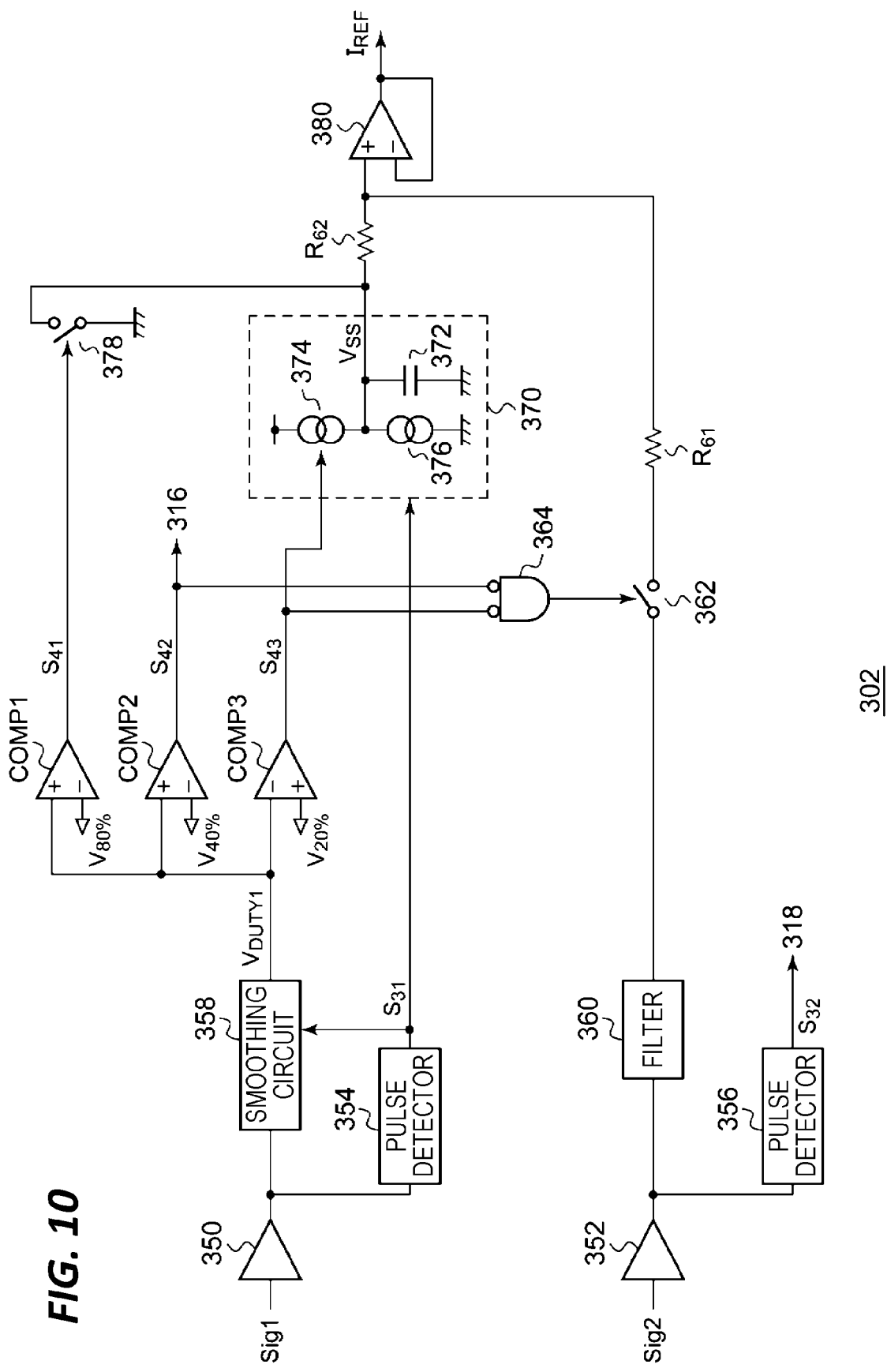
FIG. 10 is a block diagram illustrating a configuration example of a control unit.

FIG. 10 is a block diagram illustrating a configuration example of a control unit 302. A first input buffer 350 and a second input buffer 352 receive the first control signal Sig1 and the second control signal Sig2, respectively. A first pulse detector 354 determines whether the first control signal Sig1 is a pulse signal or a non-pulse signal. When the first control signal Sig1 is a pulse signal, the first pulse detector 354 generates a first determination signal $S_{31}$ at a first level (e.g., high level), and when the first control signal Sig1 is a non-pulse signal, the first pulse detector 354 generates a first determination signal $S_{31}$ at a second level (e.g., low level). That is, the first pulse detector 354 determines whether the edge of the first control signal Sig1 is input at a predetermined cycle (e.g., 200 Hz).

A dimming circuit 370 generates a signal $V_{SS}$ that defines a target value $I_{REF}$ of the output current $I_{OUT}$ of the switching converter 312. An output buffer 380 generates the target value $I_{REF}$ of the drive current $I_{OUT}$ in response to the signal $V_{SS}$.

The dimming circuit 370 includes a gradual light-on/light-off circuit. In the first light-on mode, the signal $V_{SS}$ is gradually increased at the start of light-on, and the signal $V_{SS}$ is gradually decreased at the light-off time. For example, the dimming circuit 370 may include a capacitor 372, a charging circuit 374, and a discharging circuit 376. The charging circuit 374 and the discharging circuit 376 are indicated by a symbol of the current source. However, the configuration of the charging circuit 374 and the discharging circuit 376 is not limited, and may be a resistor or a switch.

The first determination signal $S_{31}$ is supplied to at least one of blocks of the control unit 302 so that the target current $I_{REF}$ becomes zero when the first determination signal $S_{31}$ is at a low level. For example, the first determination signal $S_{31}$ is supplied to the dimming circuit 370. When the first determination signal $S_{31}$ becomes a low level, the dimming circuit 370 may set the signal $V_{SS}$ to zero.

A second pulse detector 356 determines whether the second control signal Sig2 is a pulse signal or a non-pulse signal, and generates a determination signal $S_{32}$ indicating a determination result. The determination signal $S_{32}$ is used to control the protection switch 318 in FIG. 2. When the second control signal Sig2 is a pulse signal, the determination signal $S_{32}$ becomes a high level, and the protection switch 318 is on. When the second control signal Sig2 is a non-pulse signal, the determination signal $S_{32}$ becomes a low level, the protection switch 318 is off, and the light-off mode is selected.

For example, the pulse detectors 354 and 356 may be configured by a one-shot multivibrator that may be retriggered, but are not limited thereto.

A smoothing circuit 358 is a low-pass filter for smoothing the first control signal Sig1 and generates a detection voltage $V_{DUTY1}$ corresponding to the duty ratio of the first control signal Sig1. The smoothing circuit 358 is configured to be turned on and off in response to the first determination signal $S_{31}$. When the first determination signal $S_{31}$ is at a high level, the detection voltage $V_{DUTY1}$ is generated. When the first determination signal $S_{31}$ is at a low level, the detection voltage $V_{DUTY1}$ is set to zero.

A first comparator COMP1 to a third comparator COMP3 compare the detection voltage $V_{DUTY1}$ with threshold values $V_{80\%}$, $V_{40\%}$, and $V_{20\%}$, and determine in which of the ranges of 0% to 20%, 20% to 40%, 40% to 80%, and 80% to 100% the duty ratio of the first control signal Sig1 is included. The output $S_{41}$ of the first comparator COMP1 becomes a high level when $V_{DUTY1}>V_{80\%}$. The output $S_{42}$ of the second comparator COMP2 becomes a high level when $V_{DUTY1}>V_{40\%}$. The third comparator COMP3 has the opposite logic, and the output $S_{43}$ thereof becomes a high level when $V_{DUTY1}<V_{20\%}$.

Hereinafter, the operation of the control unit 302 will be described for each range of the duty ratio of the first control signal Sig1.

(1) 0%<Duty≤20% (a third light-on mode)

In this case, the output signal $S_{43}$ of the third comparator COMP3 becomes a high level. The signal $S_{43}$ acts on the charging circuit 374 of the dimming circuit 370 so as to reduce the charging current amount to the capacitor 372. As a result, the rising rate of the voltage $V_{SS}$ becomes slower.

(2) 20%<Duty≤40% (a second light-on mode)

Both the output signals $S_{42}$ and $S_{43}$ of the second comparator COMP2 and the third comparator COMP3 are at low levels. A logic gate 364 turns on a first switch 362 when both the signals $S_{42}$ and $S_{43}$ are at low levels. The logic gate 364 may be a NOR gate.

The filter 360 causes the output of the second input buffer 352 to become dull. The output of the filter 360 acts on the input of the buffer 380 via a resistor $R_{61}$. When the duty ratio of the second control signal Sig2 is a constant value of 80% or more, the output of the filter 360 becomes a high level. In this state, the output of the filter 360 does not affect the input of the buffer 380, and the target value $I_{REF}$ is dominated by the output $V_{SS}$ of the dimming circuit 370.

When the duty ratio of the second control signal Sig2 is a constant value of 20% or less, the output of the filter 360 becomes a low level. $R_{61}<R_{62}$ is established, and the input voltage of the buffer 380 is set such that an output side of the filter 360, which is a low level, is given priority over the output signal $V_{SS}$ of the dimming circuit 370. As a result, the target value $I_{REF}$, which is the output of the buffer 380, becomes zero, and the light source 202 is turned off.

When the duty ratio of the second control signal Sig2 is changed at Duty1 (<20%) and Duty2 (>80%) at a predetermined cycle, the output of the filter 360 slowly goes back and forth between the low level and the high level. As a result, the light source 202 may be flickered.

(3) 40%<Duty≤80% (a first light-on mode)

The output $S_{42}$ of the second comparator COMP2 becomes a high level. As a result, the solenoid drive circuit 316 becomes active, the actuator 206 becomes energized, and the first light-on mode is established.

(4)80%<Duty (instantaneous light-off)

The output $S_{41}$ of the first comparator COMP1 becomes a high level. As a result, the second switch 378 is on, the output $V_{SS}$ of the dimming circuit 370 becomes zero instantaneously, and the light source 202 is turned off.

In FIG. 10, the output of the filter 360 is a flickering cycle signal, which may be associated with the light-on/light-off instruction signal $S_3$ in FIGS. 5 and 6. In FIG. 10, the output of the logic gate 364 is a signal for setting a road surface marking mode, which may be associated with the mode control signals in FIGS. 5 and 6.

It is understood that the configuration of the control unit 302 is not limited to that illustrated in FIG. 10, and that there are various modifications. For example, the control unit 302 may be configured by a digital circuit, or the same function may be implemented by software control.

A combination of the plurality of light-on modes is not limited to that described in the embodiment. When there are a plurality of light-on modes for the light source unit for the low beam or the high beam, the above-described technique may be applied to the control.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
a light source;
a driving circuit configured to flicker the light source;
an abnormality detection circuit configured to assert an abnormality detection signal while a predetermined state indicative of an abnormality state is detected during light-off of the light source; and
a timer circuit configured to: (i) advance clocking while the abnormality detection signal is asserted during light-on of the light source and reset clocking when the abnormality detection signal is negated; (ii) maintain clocked time in an immediately preceding light-on period, during the light-off of the light source; and (iii) assert a fail signal when the clocked time reaches a predetermined determination time,
wherein the abnormality detection circuit includes:
a counter having a clock input terminal and a clear terminal; and
a counter controller configured to supply a clock signal to the clock input terminal while the abnormality detection signal is asserted during the light-on of the light source, and supply a clear signal to the clear terminal when the predetermined state is not detected during the light-on of the light source.

2. The vehicular lamp of claim 1, wherein the light source includes:
a semiconductor light source configured to emit excitation light; and
a phosphor excited by the excitation light to emit fluorescence, and
the light source is configured to generate white output light including spectrums of the excitation light and the fluorescence, and
the abnormality state is leakage of the excitation light.

3. The vehicular lamp of claim 1, wherein the timer circuit includes:
a capacitor;
a charging/discharging circuit configured to charge the capacitor while the abnormality detection signal is asserted during the light-on of the light source, and discharge the capacitor when the abnormality detection signal is negated during the light-on of the light source; and
a comparator configured to compare a voltage of the capacitor with a predetermined threshold value.

4. The vehicular lamp of claim 2, wherein the timer circuit includes:
a capacitor;
a charging/discharging circuit configured to charge the capacitor while the abnormality detection signal is asserted during the light-on of the light source, and discharge the capacitor when the abnormality detection signal is negated during the light-on of the light source; and
a comparator configured to compare a voltage of the capacitor with a predetermined threshold value.

5. The vehicular lamp of claim 1, wherein the light source is used for road surface marking.

6. The vehicular lamp of claim 1, wherein the light source is commonly used for road marking and for distance-illumination high beam.

7. A method of driving a vehicular lamp, comprising:
flickering, by a driving circuit, a light source of the vehicular lamp;
asserting, by an abnormality detection circuit, an abnormality detection signal while a predetermined state indicative of an abnormality state is detected;
supplying, by a counter controller, a dock signal to a clock input terminal of a counter while the abnormality detection signal k asserted during light-on of the light source;
maintaining, by the timer circuit, docked time in an immediately preceding light-on period, during a light-off of the light source;
advancing, by a timer circuit, docking while the abnormality detection signal is asserted during light-on of the light source;
resuming docked time during a next light-on period; and asserting a fall signal when the docked time reaches a predetermined determination time,
supplying a clear signal to a clear terminal of the a counter when the predetermined state is not detected during the light-on of the light source.

8. The method of claim 7, further comprising:
resetting, by the timer circuit, clocking when the abnormality detection signal is negated.

* * * * *